(12) United States Patent
Sakon et al.

(10) Patent No.: US 10,584,465 B2
(45) Date of Patent: Mar. 10, 2020

(54) WORK VEHICLE

(71) Applicant: Komatsu Ltd., Tokyo (JP)

(72) Inventors: Yu Sakon, Tokyo (JP); Yohei Seto, Tokyo (JP); Hirofumi Miyamoto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 204 days.

(21) Appl. No.: 15/533,124

(22) PCT Filed: Dec. 28, 2016

(86) PCT No.: PCT/JP2016/089071
§ 371 (c)(1),
(2) Date: Jun. 5, 2017

(87) PCT Pub. No.: WO2018/123006
PCT Pub. Date: Jul. 5, 2018

(65) Prior Publication Data
US 2018/0266076 A1    Sep. 20, 2018

(51) Int. Cl.
*E02F 9/08*  (2006.01)
*B60K 11/02*  (2006.01)
(Continued)

(52) U.S. Cl.
CPC ............ *E02F 9/0866* (2013.01); *B60K 11/00* (2013.01); *B60K 11/02* (2013.01); *B60K 11/04* (2013.01);
(Continued)

(58) Field of Classification Search
CPC ......... B60K 11/02; B60K 11/04; B60K 11/08; B60K 11/085; F01P 11/10; F01P 2001/005
See application file for complete search history.

(56) References Cited

U.S. PATENT DOCUMENTS 3,978,938 A * 9/1976 Joscher ................. B60K 11/04
 180/68.4
4,181,172 A * 1/1980 Longhouse ............ B60K 11/04
 123/41.49
(Continued)

FOREIGN PATENT DOCUMENTS

JP 59-064427 U1 4/1984
JP 2004-142597 A 5/2004
(Continued)

*Primary Examiner* — James A Shriver, II
*Assistant Examiner* — Vaughn Coolman
(74) *Attorney, Agent, or Firm* — Lock Lord LLP

(57) ABSTRACT

A work vehicle includes a vehicle body that includes a heat exchange room in which an opening portion facing a rear side is formed, and a rear passage extending in a width direction along a lower edge portion of the opening portion behind the opening portion, a cooling unit that is provided in the heat exchange room and includes a rear surface facing the rear side, and a blower unit that includes a fan rotationally driven and a movable shroud covering the fan from an outer peripheral side, and that is movable with respect to the vehicle body so that a movement region of the blower unit overlaps the rear passage between a closed position at which the blower unit faces the rear surface of the cooling unit from the rear side and an open position at which the blower unit exposes the rear surface of the cooling unit.

17 Claims, 10 Drawing Sheets

(51) Int. Cl.
  *B60K 11/00* (2006.01)
  *B60K 11/04* (2006.01)
  *E02F 3/28* (2006.01)
(52) U.S. Cl.
  CPC .......... *E02F 9/0808* (2013.01); *E02F 9/0833* (2013.01); *E02F 9/0891* (2013.01); *B60Y 2200/40* (2013.01); *B60Y 2200/41* (2013.01); *B60Y 2200/415* (2013.01); *E02F 3/283* (2013.01)

(56) References Cited

U.S. PATENT DOCUMENTS

| | | | | |
|---|---|---|---|---|
| 4,541,369 | A * | 9/1985 | Ruhl | F01P 11/10 123/41.49 |
| 5,476,138 | A * | 12/1995 | Iwasaki | B60H 1/00321 165/41 |
| 5,623,893 | A * | 4/1997 | Bartz | F01P 5/06 123/41.49 |
| 6,390,770 | B1 * | 5/2002 | Takeshita | E02F 9/0866 415/119 |
| 6,435,264 | B1 * | 8/2002 | Konno | B60K 11/04 123/41.49 |
| 7,255,189 | B2 * | 8/2007 | Kurtz, Jr. | B60K 11/04 123/41.43 |
| 7,401,672 | B2 * | 7/2008 | Kurtz, Jr. | B60K 11/04 180/165 |
| 7,481,287 | B2 * | 1/2009 | Madson | F01P 5/06 180/68.1 |
| 7,753,152 | B2 * | 7/2010 | Nakae | B60K 11/04 165/122 |
| 7,992,665 | B2 * | 8/2011 | Giovannini | B62D 25/10 180/69.2 |
| 8,454,718 | B2 * | 6/2013 | Buchmann | F01P 11/12 55/385.3 |
| 8,479,855 | B2 * | 7/2013 | Kim | B60K 11/02 180/68.3 |
| 8,528,677 | B2 * | 9/2013 | Davis | F01P 11/12 123/41.19 |
| 8,695,722 | B2 * | 4/2014 | Fukazawa | B60K 11/04 172/811 |
| 8,800,704 | B2 * | 8/2014 | Kitaoka | E02F 9/0866 180/311 |
| 8,893,834 | B2 * | 11/2014 | Berkeland | B62D 25/12 180/68.1 |
| 10,005,354 | B2 * | 6/2018 | Choi | F25B 6/04 |
| 10,047,496 | B2 * | 8/2018 | Yamashita | E02F 9/16 |
| 10,287,962 | B2 * | 5/2019 | Kurokawa | F01N 13/08 |
| 2002/0074104 | A1 * | 6/2002 | Dion | B60K 11/04 165/41 |
| 2003/0230904 | A1 | 12/2003 | Brockway | |
| 2006/0112909 | A1 * | 6/2006 | Esau | F01P 5/06 123/41.49 |
| 2007/0160468 | A1 * | 7/2007 | Tsubota | F01P 5/06 415/173.6 |
| 2008/0023174 | A1 * | 1/2008 | Nakae | B60K 11/04 165/42 |
| 2008/0134997 | A1 * | 6/2008 | Ito | F01P 5/06 123/41.65 |
| 2008/0135209 | A1 * | 6/2008 | Lowe | B60K 11/04 165/77 |
| 2009/0272341 | A1 * | 11/2009 | Ito | B60K 11/04 123/41.49 |
| 2011/0272967 | A1 * | 11/2011 | Davisdon | B60R 19/52 296/193.1 |
| 2012/0085510 | A1 * | 4/2012 | Kim | B60K 11/02 165/44 |
| 2013/0000999 | A1 * | 1/2013 | Naito | B60R 19/52 180/68.1 |
| 2013/0087398 | A1 * | 4/2013 | Kotani | F28F 9/002 180/68.4 |
| 2013/0153180 | A1 * | 6/2013 | Montocchio | B60K 11/04 165/121 |
| 2014/0056675 | A1 * | 2/2014 | Kitaoka | E02F 9/0866 414/685 |
| 2014/0102675 | A1 * | 4/2014 | Ingold | F04D 25/04 165/121 |
| 2014/0191537 | A1 | 7/2014 | Bilbruck et al. | |
| 2014/0329451 | A1 * | 11/2014 | Darling | F01P 5/02 454/143 |
| 2015/0017901 | A1 * | 1/2015 | Pfohl | F01P 5/043 454/141 |
| 2015/0136523 | A1 | 5/2015 | Madera et al. | |
| 2015/0376867 | A1 * | 12/2015 | Kobayashi | E02F 3/7645 180/309 |
| 2016/0193910 | A1 * | 7/2016 | Barzen | F01P 5/06 180/68.1 |
| 2016/0311311 | A1 * | 10/2016 | Choi | F25B 6/04 |
| 2017/0073929 | A1 * | 3/2017 | Tanaka | B60K 11/04 |
| 2017/0218832 | A1 * | 8/2017 | Kurokawa | F01N 13/1805 |
| 2018/0044884 | A1 | 2/2018 | Tsutsumi et al. | |
| 2018/0126912 | A1 | 5/2018 | Tanaka et al. | |

FOREIGN PATENT DOCUMENTS

| | | |
|---|---|---|
| JP | 2005-297644 A | 10/2005 |
| JP | 2007-283801 A | 11/2007 |
| JP | 2012-111468 A | 6/2012 |
| WO | 2004/099581 A1 | 11/2004 |
| WO | 2012/086521 A1 | 6/2012 |
| WO | 2016/151729 A1 | 9/2016 |
| WO | 2016/189564 A1 | 12/2016 |

* cited by examiner

WORK VEHICLE

TECHNICAL FIELD

The present invention relates to a work vehicle.

BACKGROUND ART

Patent Document 1 discloses a wheel loader including a cooling unit having a radiator or the like and a blower unit blowing air to the cooling unit as an example of a work vehicle.

The blower unit of the wheel loader is rotatably attached to a vehicle body so as to be switchable between a closed position at which the blower unit faces the cooling unit from the rear side and an open position at which the blower unit exposes the cooling unit to the outside.

CITATION LIST

Patent Literature

[Patent Document 1] Japanese Unexamined Patent Application, First Publication No. 2004-142597

SUMMARY OF INVENTION

Technical Problem

A blower unit of a work vehicle may be provided at a high location where it is difficult for a worker to reach by hand. Therefore, when maintenance work such as cleaning is performed on the blower unit or a cooling unit, it is necessary to separately install a platform, a ladder or the like for a worker to climb, which causes the work to be complicated.

The present invention is made in consideration of the above-described problem, and an object thereof is to provide a work vehicle in which work with respect to a cooling unit or a blower unit can be easily performed.

Solution to Problem

According to an aspect of the present invention, a work vehicle includes: a vehicle body that includes a heat exchange room in which an opening portion facing a rear side is formed, and a rear passage extending in a width direction along a lower edge portion of the opening portion behind the opening portion; a cooling unit that is provided in the heat exchange room and includes a rear surface facing the rear side; and a blower unit that includes a fan rotationally driven and a movable shroud covering the fan from an outer peripheral side, and that is supported to be movable with respect to the vehicle body so that a movement region of the blower unit in a plan view overlaps the rear passage between a closed position at which the blower unit faces the rear surface of the cooling unit and an open position at which the blower unit exposes the rear surface of the cooling unit.

According to the work vehicle having the above-described configuration, a worker can perform work on both of the blower unit and the cooling unit on the rear passage when the blower unit is at the open position.

Advantageous Effects of Invention

According to the work vehicle of the aspect, it is possible to easily perform various works for the cooling unit or the blower unit.

DESCRIPTION OF EMBODIMENTS

<Embodiment>

Hereinafter, an embodiment of a wheel loader as an example of a work vehicle according to the present invention will be described in detail with reference to FIGS. 1 to 10.

<Work Vehicle>

Figure 1:
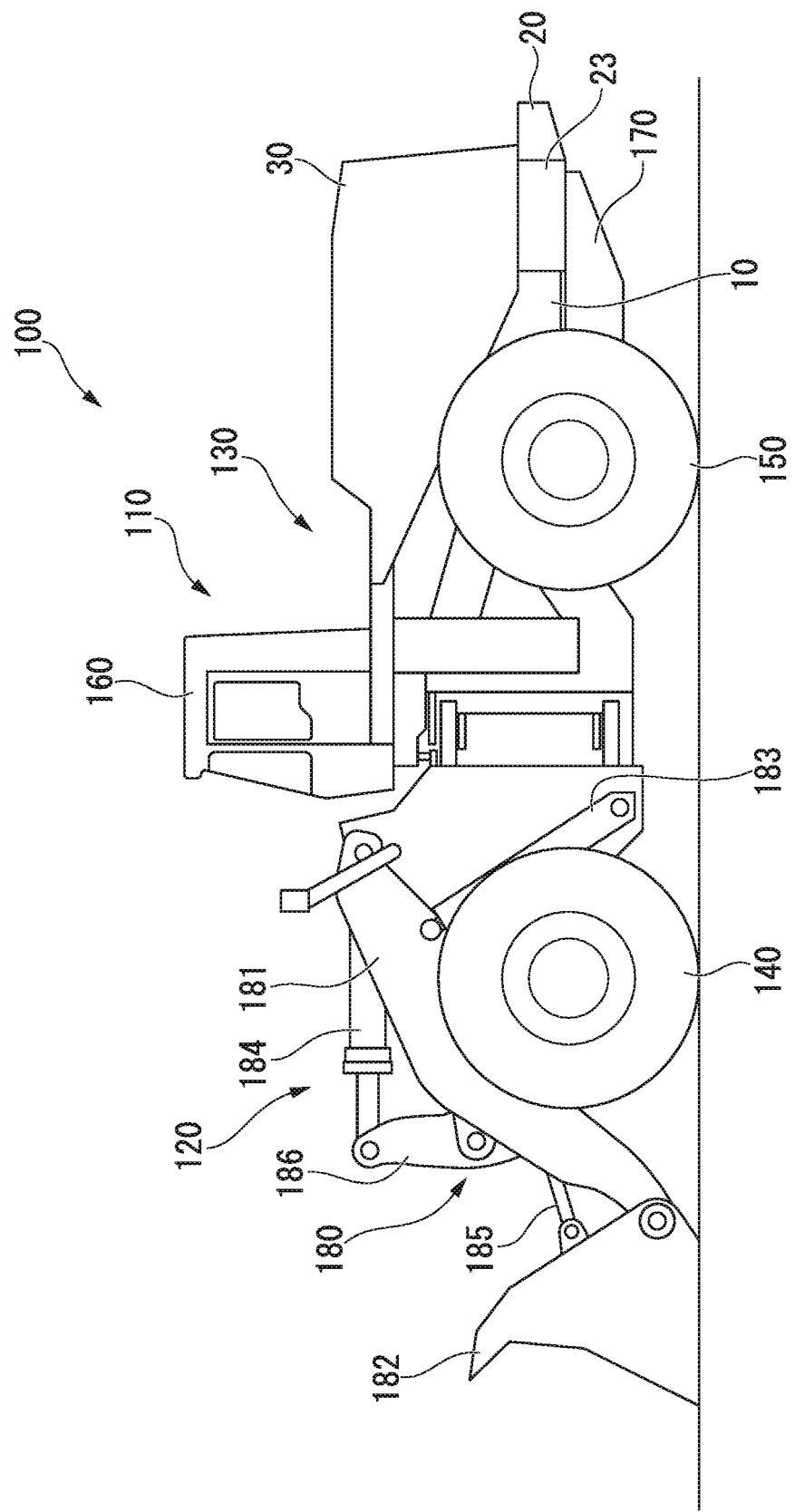
FIG. 1 is a side view of a wheel loader as a work vehicle according to an embodiment of the present invention.
Figure 2:
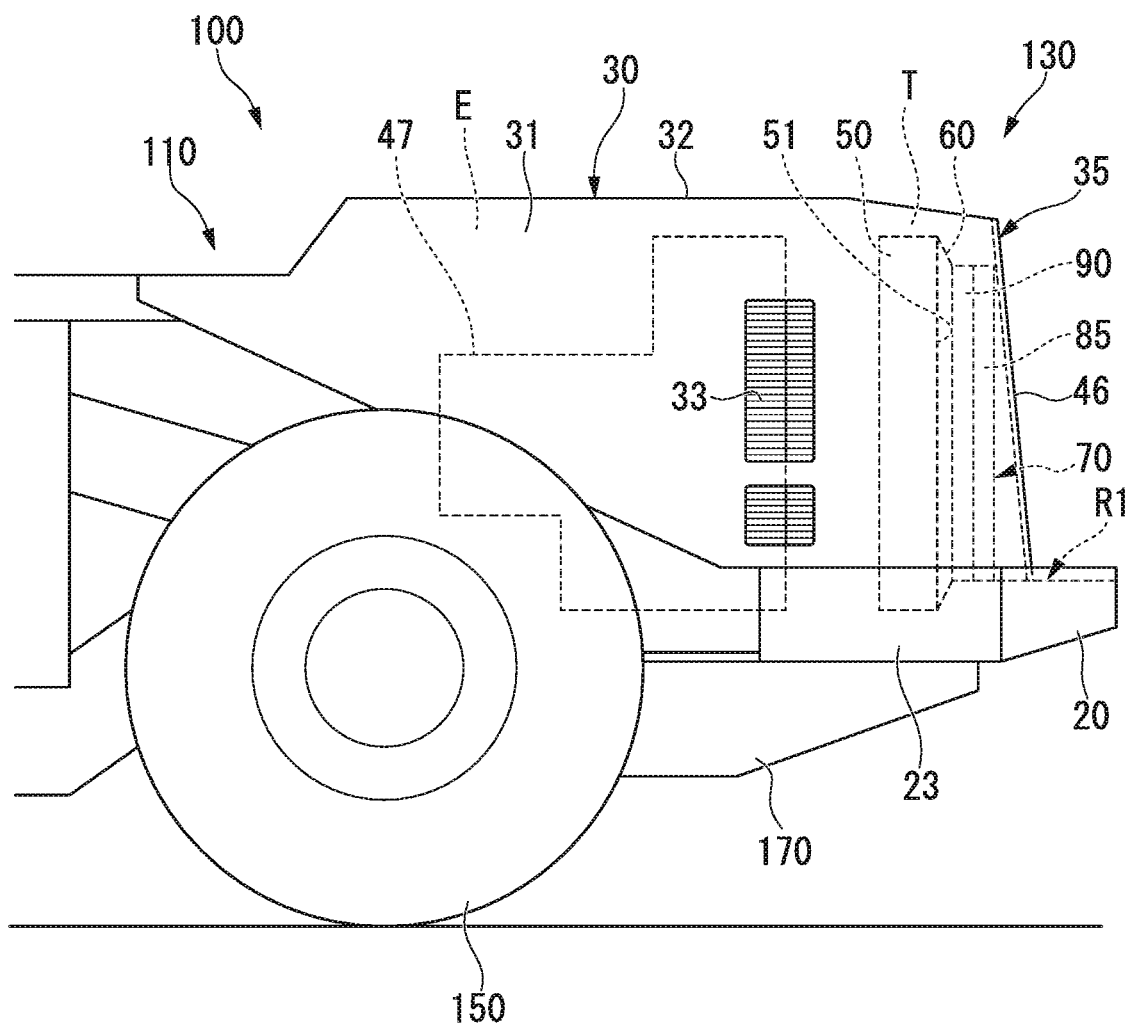
FIG. 2 is a side view of a vehicle rear portion of the wheel loader as the work vehicle according to the embodiment of the present invention.

As shown in FIGS. 1 and 2, a wheel loader 100 as a work vehicle includes a vehicle body 110, a work equipment 180, an engine 47, a cooling unit 50, a fixation shroud 60, and a blower unit (movable portion) 70.

As shown in FIG. 1, the vehicle body 110 includes a vehicle front portion 120, a vehicle rear portion 130, front wheels 140, rear wheels 150, a cab 160, and a fuel tank 170. The vehicle front portion 120 configures a front portion of the vehicle body 110 and the vehicle rear portion 130 configures a rear portion of the vehicle body 110. The vehicle front portion 120 and the vehicle rear portion 130 are connected to be rotatable in a horizontal direction to each other.

The front wheels 140 are provided in the vehicle front portion 120 and the rear wheels 150 are provided in the vehicle rear portion 130. The vehicle body 110 moves forward and backward by driving the front wheels 140 and the rear wheels 150.

The cab 160 is provided to protrude upward on the portion on the front side of the vehicle rear portion 130. A driver seat is provided inside the cab 160.

The fuel tank 170 is provided below the vehicle rear portion 130, and a fuel is stored inside the fuel tank 170.

Hereinafter, a forward-backward direction, a front side, a rear side, and a width direction of the vehicle body 110 may be simply referred to as a "forward-backward direction", a "front side", a "rear side", and a "width direction", respectively. In addition, the width direction may be referred to as a "right side" or a "left side". In addition, a side toward the center in the width direction may be referred to as an "inside", and a side from the center in the width direction toward the right side or the left side may be referred to as an "outside".

The work equipment 180 is provided on a front side portion of the vehicle front portion 120 of the vehicle body 110. The work equipment 180 includes a boom 181 and a bucket 182. The boom 181 is connected to the vehicle body 110 to be rotatable. In addition, the bucket 182 is connected to one end of a bell crank 186 via a link 185. A bucket drive cylinder 184 is connected to the other end of the bell crank 186. The bucket 182 is connected to the tip of the boom 181 to be rotatable. The boom 181 is driven by a boom drive cylinder 183 and the bucket 182 is driven by the bucket drive cylinder 184. The boom drive cylinder 183 and the bucket drive cylinder 184 are driven by a hydraulic pressure supplied via a hydraulic circuit.

<Vehicle Rear Portion>

Hereinafter, a vehicle rear portion 130 will be described in more detail with reference to FIGS. 2 to 4.

The vehicle rear portion 130 includes a rear frame 10, a bumper 20, an exterior cover 30, a support frame 40, rear lights (upper structures) 45, and a grille 46.

The rear frame 10 has a bar shape which extends in the forward-backward direction, and a pair of rear frames 10 is provided to be parallel to each other with an interval therebetween in the width direction.

<Bumper>

The bumper 20 is provided to extend in the width direction over the pair of rear frames 10 on the rear sides of the pair of rear frames 10. The bumper 20 may be directly fixed to the pair of rear frames 10, or may be fixed to the pair of rear frames 10 via another member such as an end plate provided over the pair of rear frames 10.

Figure 3:
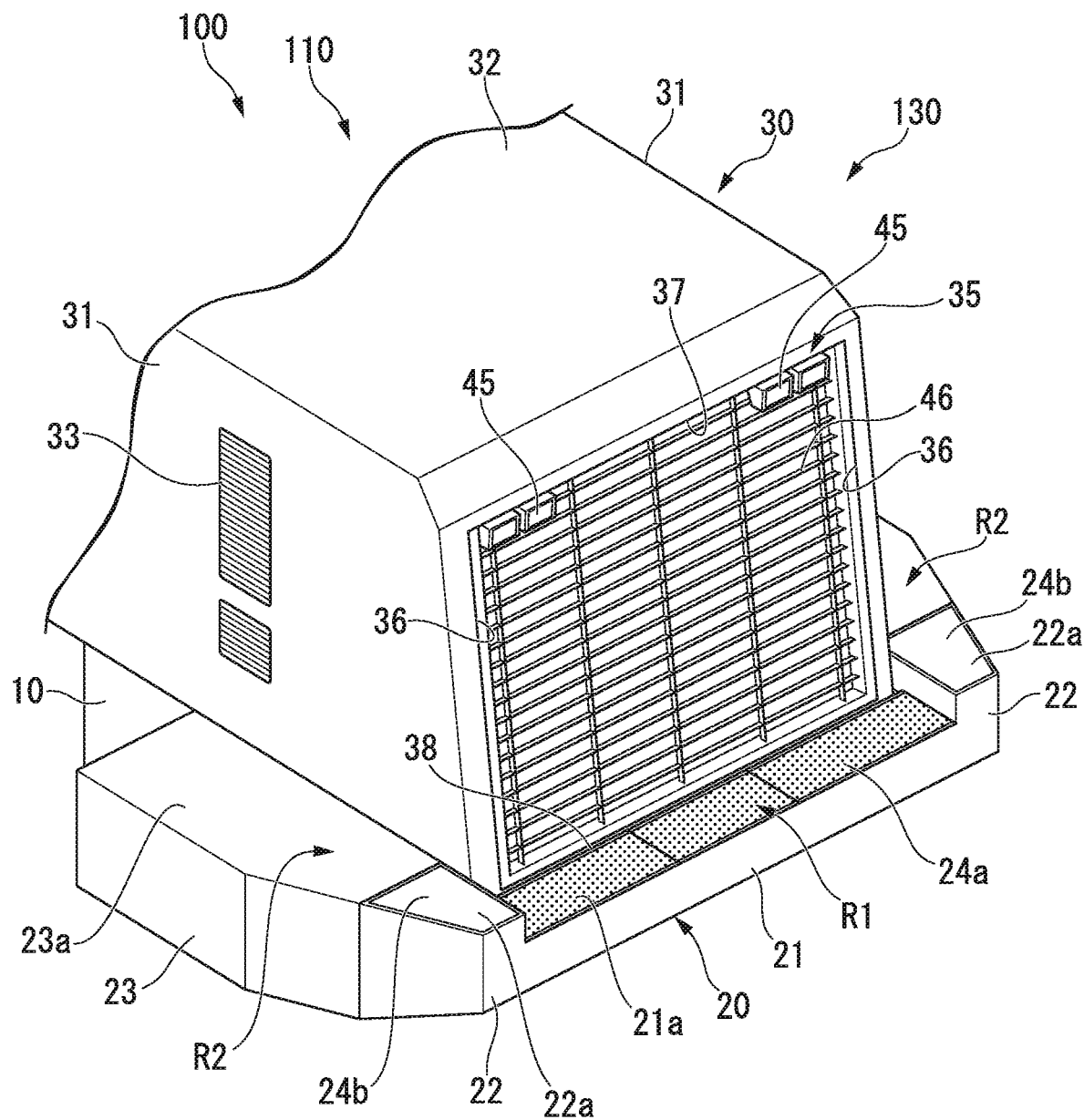
FIG. 3 is a perspective view of the vehicle rear portion of the wheel loader as the work vehicle according to the embodiment of the present invention.

As shown in FIG. 3, in the bumper 20, the center portion in the width direction becomes a bumper center portion 21, and both right and left portions of the bumper center portion 21 become bumper side portions 22.

The bumper center portion 21 extends over the gap between the pair of rear frames 10 in the width direction. More specifically, the bumper center portion 21 extends between an end portion on the outside in the width direction of one rear frame 10 and an end portion on the outside in the width direction of the other rear frame 10. An upper surface 21a of the bumper center portion 21 extends in the width direction so as to be parallel to a horizontal surface, and a portion on the upper surface 21a extends in the width direction and becomes a rear passage R1 through which a worker can pass. In the present embodiment, a nonslip mat 24a formed of a resin or the like is provided on the upper surface 21a of the bumper center portion 21, which becomes the rear passage R1, over the width direction of the vehicle body 110. The nonslip mat 24a may be a steel plate having an uneven surface.

The bumper side portions 22 are positioned further outside in the width direction than the outside of the rear frame 10 in the width direction and are provided on both end sides of the bumper center portion 21. An upper surface 22a of each of the bumper side portions 22 is parallel to the horizontal surface, and is disposed so as to be higher by one step than the bumper center portion 21. Accordingly, a step is formed between the upper surface 22a of the bumper side portion 22 and the upper surface 21a of the bumper center portion 21.

For example, an accommodation portion 23 in which a device such as a battery can be accommodated is provided on the front sides of the bumper side portions 22 and the outside of the rear frame 10 in the width direction. The rear side of the accommodation portion 23 is in contact with the bumper side portion 22 and the inside of the accommodation portion 23 in the width direction is in contact with the rear frame 10. The accommodation portion 23 may be directly fixed to the rear frame 10 and may be fixed to the rear frame 10 via the end plate.

An upper surface 23a of the accommodation portion 23 has the same height as that of the upper surface 22a of the bumper side portion 22 and the upper surface 23a extends in the forward-backward direction so as to be parallel to the horizontal surface. The portion on the upper surface 23a of the accommodation portion 23 and the portion on the upper surfaces 22a of the bumper side portions 22 become a side passage R2 which extends on the bumper side portions 22 and the accommodation portion 23 in the forward-backward direction. Similarly to the rear passage R1, a nonslip mat 24b is provided on the upper surfaces 22a of the bumper side portions 22 and the upper surface 23a of the accommodation portion 23 which become the side passage R2.

<Exterior Cover>

Figure 4:
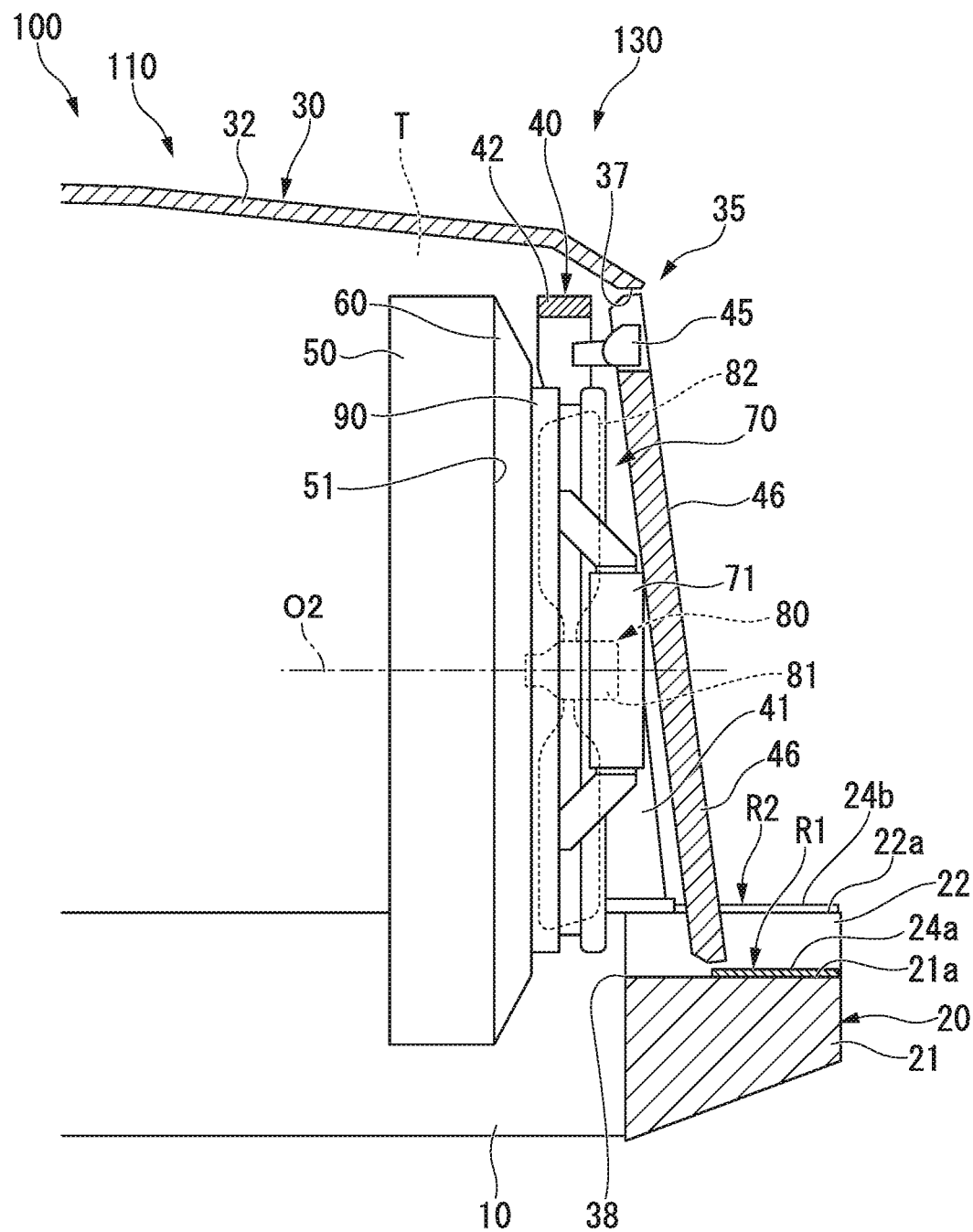
FIG. 4 is a side view of a cooling unit and a blower unit at a closed position in a state where the vehicle rear portion of the wheel loader as the work vehicle according to the embodiment of the present invention is shown in a vertical section.

As shown in FIGS. 2 to 4, the exterior cover 30 includes a pair of side covers 31 and a top cover 32.

The pair of side covers 31 has a panel shape which extends in a vertical direction and the forward-backward direction, and is provided with an interval therebetween in the width direction. Each of the lower ends of the pair of side covers 31 is fixed to each of the pair of corresponding rear frames 10 in the width direction.

The top cover 32 has a panel shape which extends in the forward-backward direction and the horizontal direction. Both ends of the top cover 32 in the width direction are connected to the upper ends of the pair of side covers 31 in the forward-backward direction.

An internal space is formed inside the exterior cover 30 by the exterior cover 30 including the pair of side covers 31 and the top cover 32. The front side portion of the internal space becomes an engine room E, and the rear side portion thereof becomes a heat exchange room T. A partition plate may be provided between the engine room E and the heat exchange room T such that air can flow through a portion between the engine room E and the heat exchange room T, or the engine room E and the heat exchange room T may communicate with each other without providing the partition plate. A ventilation portion 33 through which air can flow between the inside of the engine room E and the outside of the exterior cover 30 is formed at a location of the side cover 31 corresponding to the engine room E.

An opening portion 35 which exposes the heat exchange room T toward the rear side is formed on the rear end of the exterior cover 30. The opening portion 35 has a rectangular shape in which the rear ends extending in the vertical direction in the side covers 31 become side edge portions 36, the rear end extending in the width direction in the top cover 32 becomes an upper edge portion 37, and the front end extending in the width direction on the upper surface 21a of the bumper center portion 21 becomes a lower edge portion 38. That is, the opening portion 35 is formed to be partitioned by the rear end of the exterior cover 30 and the front end of the bumper 20. The rear passage R1 is positioned to extend in the width direction along the lower edge portion 38 of the opening portion 35 on the rear side of the opening portion 35.

<Support Frame>

Figure 5:
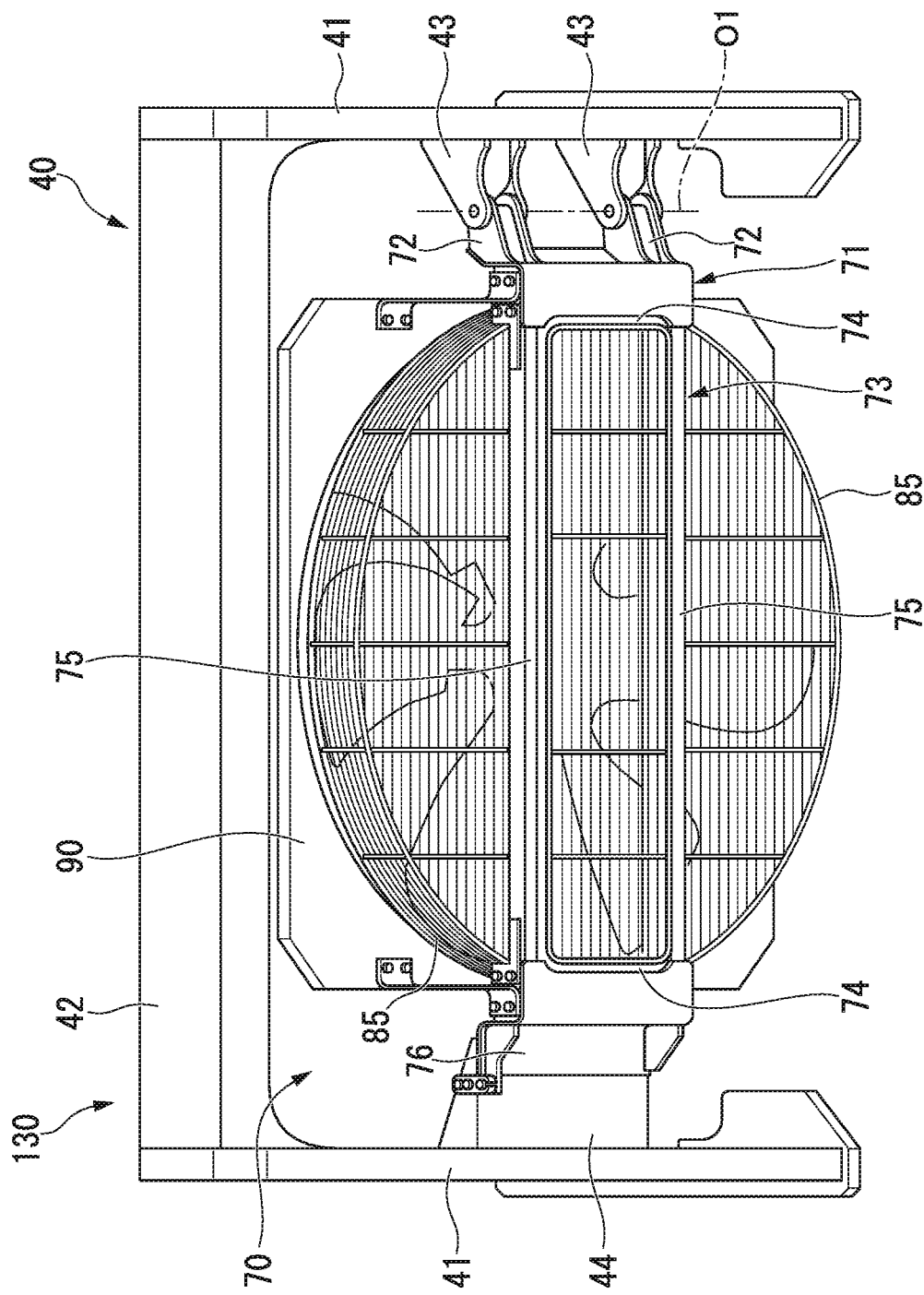
FIG. 5 is a perspective view when the blower unit and a support frame which supports the blower unit are viewed from the rear and above.

As shown in FIGS. 4 and 5, the support frame 40 is a gate-shaped member provided at a position on the rear side of the heat exchange room T inside the exterior cover 30, that is, a position on the opening portion 35 side. The support frame 40 has a function of supporting the blower unit 70. As shown in FIG. 5, the support frame 40 includes a pair of side frames 41, an upper frame (upper structure) 42, rotating brackets 43, and a fixing bracket 44.

As shown in FIGS. 4 and 5, the pair of side frames 41 has a bar shape extending in the vertical direction and is provided with an interval therebetween in the width direction. The lower end of each of the pair of side frames 41 is fixed to the corresponding rear frame 10 in the width direction. The pair of side frames 41 is disposed along the inner surfaces of the corresponding side covers 31. The side cover 31 may be fixed to the outside of the side frame 41 in the width direction. The pair of side frames 41 is provided along the side edge portions 36 of the opening portion 35 to approach the side edge portions 36.

The upper frame 42 has a bar shape which extends over the pair of rear frames 10 in the width direction so as to connect the upper ends of the pair of rear frames 10 to each other. The top cover 32 of the exterior cover 30 may be fixed to the upper surface of the upper frame 42. The upper frame 42 is provided along the upper edge portion 37 of the opening portion 35 to approach the upper edge portion 37.

Each of the rotating brackets 43 has a function as a rotation support portion which rotatably supports the blower unit 70. The rotating brackets 43 are integrally provided on one (the side frame 41 on the right side in the width direction) of the pair of side frames 41. The rotating brackets 43 are provided to protrude further inside in the width direction from the surface of the side frame 41 facing the inside in the width direction. A plurality of (two in the present embodiment) rotating brackets 43 are provided at intervals therebetween in the vertical direction, that is, the extension direction of the side frame 41. Hole portions which extend along a rotation axis O1 extending in the vertical direction are formed in the rotating brackets 43. Holes of the plurality of rotating brackets 43 are positioned on the same rotation axis O1.

Since the rotating brackets 43 are disposed on one side in the width direction in the heat exchange room T, the rotation axis O1 passing through the rotating bracket 43 is disposed on one side in the width direction in the heat exchange room T. The rotation axis O1 extends in the vertical direction along the side edge portion 36 on one side of the opening portion 35 in the width direction.

The fixing bracket 44 has a function of supporting the blower unit 70, which is detachably fixed to the fixing bracket 44 in a fixed state. The fixing bracket 44 is integrally provided on the other (the side frame 41 on the left side in the width direction) of the pair of side frames 41. The fixing bracket 44 is provided to protrude further inside from the surface of the side frame 41 facing the inside in the width direction.

<Rear Light>

As shown in FIGS. 3 and 4, rear lights 45 are provided to illuminate the rear side of the vehicle rear portion 130 from the opening portion 35 of the vehicle rear portion 130. For example, the rear lights 45 are fixed to the support frame 40, and are provided to protrude from the support frame 40 to the rear side. A pair of rear lights 45 is provided at intervals therebetween in the width direction on locations on the upper side of the opening portion 35. The rear lights 45 are provided on the upper side of the opening portion 35 and both corner portions thereof in the width direction. In addition, the installation locations of the rear lights 45 are not limited to the support frame 40, and the rear lights 45 may be provided on other portions configuring the vehicle rear portion 130.

<Grille>

As shown in FIGS. 3 and 4, the grille 46 is supported to the support frame 40, and the grille 46 is rotatably provided between a closed state where the opening portion 35 of the vehicle rear portion 130 is closed and an open state where the opening portion is open. The grille 46 is provided to be at a posture inclined frontwards toward the front side in a state where the grille 46 closes the opening portion 35. The grille 46 is supported to be rotatable around an axis which extends in the vertical direction and is inclined frontwards with respect to one (the side frame 41 on the right side in the width direction) of the pair of side frames 41.

The grille 46 has a lattice shape including a plurality of bar-shaped members, and the outline of the grille 46 is formed in a rectangular shape corresponding to the shape when the opening portion 35 is viewed in the forward-backward direction. In the present embodiment, the upper portion and both sides in the width direction of the grille 46 are notched so as to avoid interference with the pair of rear lights 45 in a state where the opening portion 35 is closed.

<Engine>

As shown in FIG. 2, the engine 47 is provided in the engine room E, which is the front side portion of the internal space of the exterior cover 30. The engine 47 is driven by a fuel supplied from the fuel tank 170. A driving force of the engine 47 is transmitted to the front wheels 140 and the rear wheels 150 via a shaft or the like. Accordingly, the wheel loader 100 moves forward and backward. The driving force of the engine 47 is transmitted to a hydraulic pump (not shown). A hydraulic oil pressurized by the hydraulic pump is supplied to hydraulically driven devices such as the boom drive cylinder 183 or the bucket drive cylinder 184 via a hydraulic circuit. The engine 47 has a water-cooled structure.

<Cooling Unit>

As shown in FIGS. 2 and 4, the cooling unit 50 is provided in the heat exchange room T inside the exterior cover 30. The cooling unit 50 is provided on the front side from the above-described opening portion 35 or support frame 40.

The cooling unit 50 includes cooling devices such as a radiator, an oil cooler, or an after-cooler, and an outer frame in which the cooling devices are accommodated. The outer frame has a rectangular parallelepiped shape in which the shape viewed from the front side and the rear side is a rectangular shape.

The radiator is provided on the rear side in the outer frame. The radiator has a function of cooling cooling water heated by cooling the engine 47. The radiator includes a plurality of radiation tubes through which the cooling water of the engine 47 flows. The radiator tubes are disposed at intervals therebetween such that air flows through the radiator in the forward-backward direction. Fins for promoting radiation may be provided between the radiation tubes adjacent to each other.

The oil cooler has a function of cooling the hydraulic oil which flows through the hydraulic circuit. The oil cooler is disposed on the front side of the radiator in the outer frame.

The after-cooler has a function of cooling the supplied air before the air is compressed and introduced to the engine 47 in order to increase intake air efficiency of the engine 47 and improve performance of the engine 47. The after-cooler is disposed on the front side of the radiator in the outer frame.

The radiator, the oil cooler, and the after-cooler may be provided so as to be lifted out upward with respect to the outer frame.

As shown in FIG. 4, the surface formed by the plurality of radiator tubes in the radiator is exposed to the entire region of the rear surface 51 facing the rear side of the cooling unit 50. The rear surface 51 of the cooling unit 50 has a planar shape orthogonal to the forward-backward direction. The shape of the rear surface 51 of the cooling unit 50 viewed from the rear side has a rectangular shape in which the sides coincide with those of the outer frame in the vertical direction and the width direction according to the shape of the outer frame.

Each of the surfaces of the cooling unit 50 facing the outside in the width direction in the heat exchange room T is fixed to the pair of rear frames 10. The lower portion of the cooling unit 50 is positioned inside the pair of rear frames 10 so as to be interposed between the pair of rear frames 10. The lower end of the cooling unit 50 is positioned below the lower edge portion 38 of the opening portion 35 of the vehicle rear portion 130. Accordingly, when the vehicle rear portion 130 is viewed from the rear side, the lower portion of the cooling unit 50 and the rear-side bumper 20 overlap each other.

The upper end of the cooling unit 50 is positioned above the lower end of the rear lights 45 and the lower end of the upper frame 42 of the support frame 40. Accordingly, when the opening portion 35 of the vehicle rear portion 130 is viewed from the rear side, the upper portion of the cooling unit 50, the rear lights 45 on the rear side, and the upper frame 42 overlap each other.

<Fixation Shroud>

Figure 6:
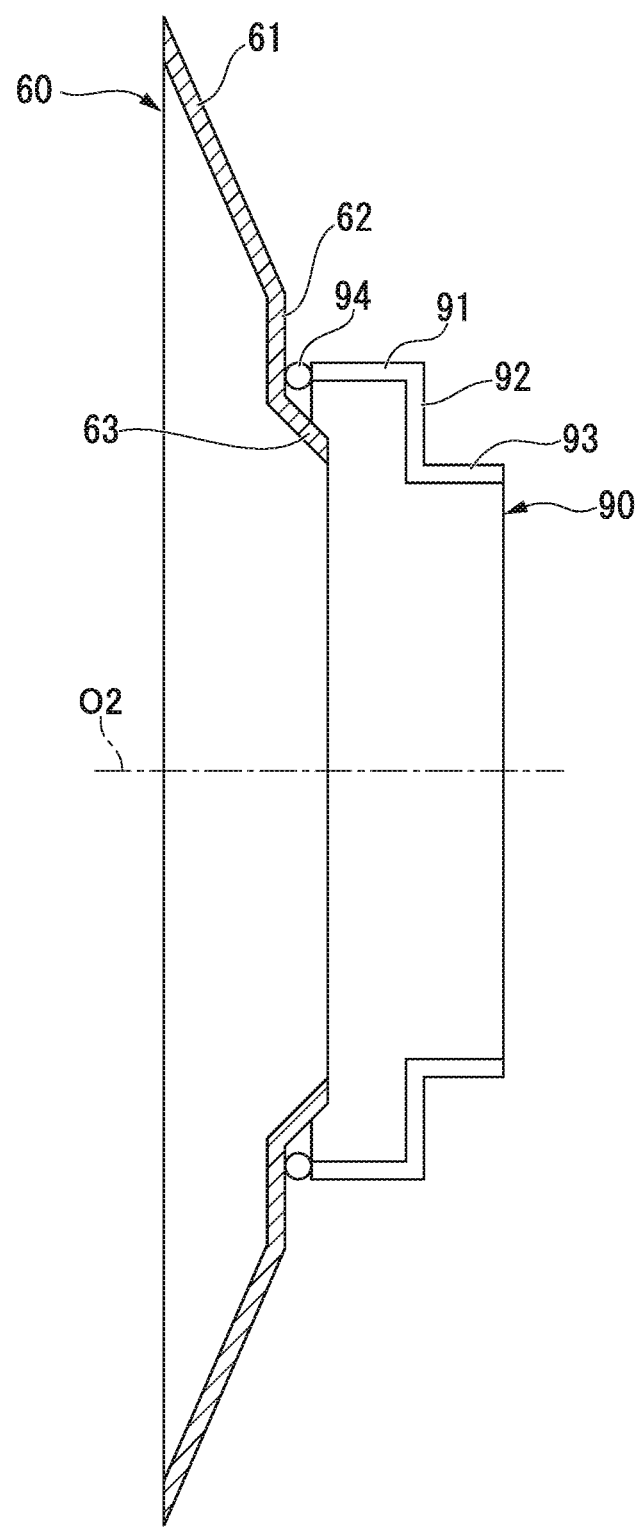
FIG. 6 is a longitudinal sectional view of a fixation shroud and a movable shroud.

As shown in FIGS. 4 and 6, the fixation shroud 60 is a member provided on the rear side of the cooling unit 50 in the heat exchange room T of the vehicle rear portion 130. The fixation shroud 60 is an annular member which surrounds a reference axis O2 which extends in the forward-backward direction. The reference axis O2 is an axis which extends in the forward-backward direction passing through the center of the rear surface 51 of the cooling unit 50. The fixation shroud 60 has a function of guiding air which flows inside from the front side of the cooling unit 50 and flows from the rear surface 51 of the cooling unit 50 to the rear side further backward. The diameter of the inner peripheral surface of the fixation shroud 60 decreases toward the rear side. Accordingly, in a flow path inside the fixation shroud 60, the flow path cross-sectional area orthogonal to the reference axis O2 decreases toward the rear side. Similarly to the inner peripheral surface, the diameter of the outer peripheral surface of the fixation shroud 60 decreases toward the rear side.

As shown in FIG. 6, the fixation shroud 60 includes a first taper portion 61, a fixed-side step portion 62, and a second taper portion 63.

The first taper portion 61 is the front portion of the fixation shroud 60, and the opening of the front portion has a shape according to the outline of the rear surface 51 of the cooling unit 50. In the present embodiment, since the rear surface 51 of the cooling unit 50 has a rectangular shape, the opening shape of the front end of the first taper portion 61 also has a rectangular shape. The first taper portion 61 has a shape in which the flow path cross-sectional area decreases toward the rear side. That is, in a sectional view including the reference axis O2, the first taper portion 61 has a taper shape in which a diameter decreases to be inclined to the inside in a radial direction of a virtual circle having the reference axis O2 as a center toward the rear side.

The fixed-side step portion 62 is connected to the rear end of the first taper portion 61, and has a flat-plate shape extending in the direction orthogonal to the reference axis O2, that is, a flat-plate shape having a surface orthogonal to the forward-backward direction. The end portion on the outside in the radial direction of a virtual circle having the reference axis O2 as a center in the fixed-side step portion 62 is connected to the rear end of the first taper portion 61. The fixed-side step portion 62 extends from the outer end of the fixed-side step portion 62 toward the inner end thereof such that the opening area on the rear side of the first taper portion 61 decreases. That is, the fixed-side step portion 62 extends to the inside in the radial direction of the virtual circle having the reference axis O2 as a center.

The opening shape of the front end of the second taper portion 63 has an octagonal shape, and the front end is connected to the end portion on the inside in the radial direction of the fixed-side step portion 62. The second taper portion 63 has a shape in which a flow path cross-sectional area decreases from the end portion on the inside in the radial direction of the reference axis O2 in the fixed-side step portion 62 toward the rear side. In a sectional view including the reference axis O2, the second taper portion 63 has a taper shape in which a diameter decreases to be inclined to the inside in a radial direction of the reference axis O2 as a center toward the rear side. The opening shape of the rear end of the second taper portion 63 has an octagonal shape.

Figure 7:
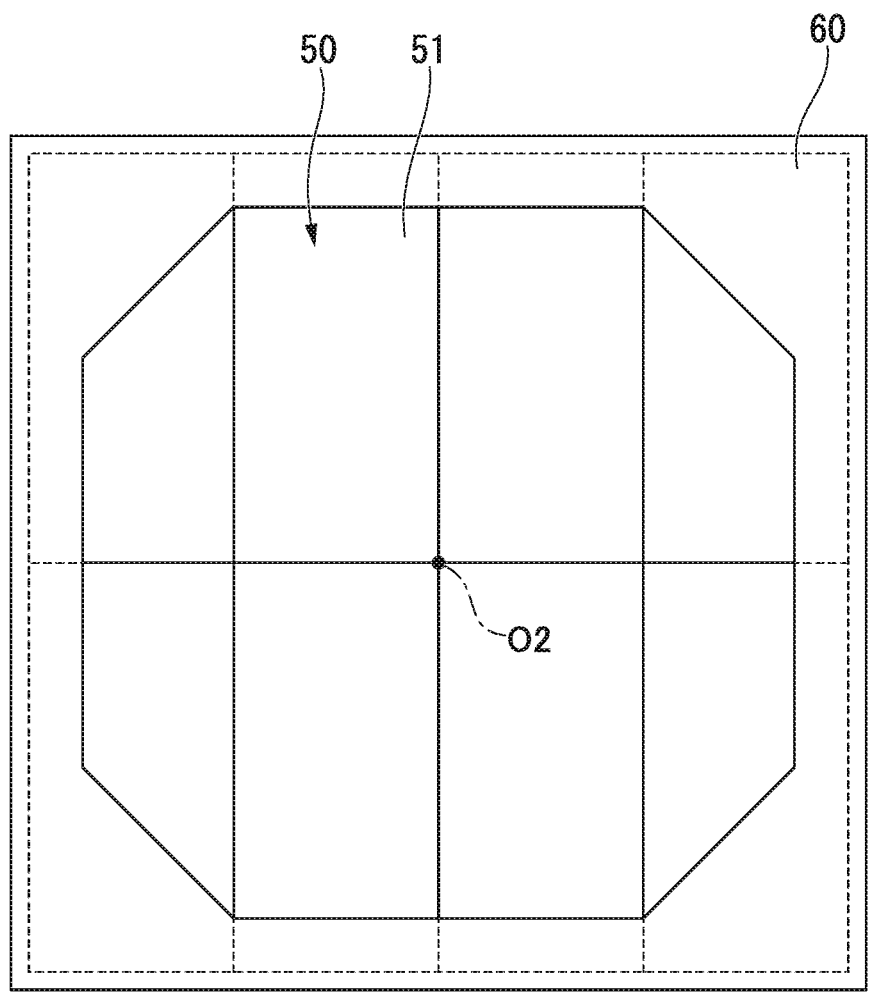
FIG. 7 is a schematic view when the fixation shroud is viewed from the rear side.

Accordingly, as shown in FIG. 7, the opening shape of the rear end of the fixation shroud 60 has an octagonal shape while the opening shape of the front end of the fixation shroud 60 has a rectangular shape according to the shape of the rear surface 51 of the cooling unit 50. The area of the opening shape of the rear end of the fixation shroud 6 orthogonal to the reference axis O2, that is, the flow path cross-sectional area is smaller than that of the opening shape of the front end thereof.

In the present embodiment, the front end of the fixation shroud 60, that is, the front end of the first taper portion 61 is integrally fixed to the outer periphery portion of the rear surface 51 of the cooling unit 50. Accordingly, similarly to the cooling unit 50, the lower end of the fixation shroud 60 is positioned below the rear passage R1 on the bumper 20, and the upper end of the fixation shroud 60 is positioned above the rear lights 45 and the lower end of the upper frame 42 of the support frame 40.

Accordingly, if the fixation shroud 60 is attempted to be moved to the outside via the opening portion 35, the fixation shroud 60 interferes with the bumper 20, the rear lights 45, and the upper frame 42.

Similarly to the rear surface 51 of the cooling unit 50, the dimensions of the fixation shroud 60 in the vertical direction when viewed from the rear side are larger than the dimensions of the opening portion in the vertical direction. In the present embodiment, the dimensions of the fixation shroud 60 and the rear surface 51 of the cooling unit 50 in the width direction are substantially the same as the dimensions of the opening portion 35 in the width direction. Accordingly, areas of the fixation shroud 60 and the rear surface 51 of the cooling unit 50 when viewed from the rear side are larger than the opening area of the opening portion 35.

In addition, any configuration may be adopted as long as the relative position of the fixation shroud 60 with respect to the cooling unit 50 is fixed. Accordingly, not only the configuration in which the fixation shroud 60 is fixed to the cooling unit 50 but a configuration in which the fixation shroud 60 is also fixed to the vehicle rear portion 130 may be adopted.

<Blower Unit>

As shown in FIGS. 2, 4 to 6, and 8, the blower unit 70 is supported to be rotatable around the rotation axis O1 with respect to the vehicle rear portion 130 on the rear side of the fixation shroud 60. The blower unit 70 has a function of supplying air for cooling the cooling unit 50 to the cooling unit 50. The blower unit 70 is supported to be rotatable between a closed position at which the blower unit 70 faces the rear surface 51 of the cooling unit 50 from the rear side and an open position at which the blower unit 70 exposes the rear surface of the cooling unit.

The blower unit 70 includes a movable bracket 71, a fan 80, a guard portion 85, and a movable shroud 90.

<Movable Bracket>

The movable bracket 71 is rotatably supported with respect to the vehicle rear portion 130 and has a function of supporting the fan 80, the movable shroud 90, and the guard portion 85. As shown in FIG. 5, the movable bracket 71 includes rotation connection portions 72, a bracket body 73, and a fixing connection portion 76.

The rotation connection portions 72 are connected to the rotating brackets 43 of the support frame 40 to be rotatable around the rotation axis O1. In the present embodiment, the movable bracket 71 has a pair of rotation connection portions 72 corresponding to the pair of the rotating brackets 43. For example, each of the rotation connection portions 72 is rotatably connected to each rotating bracket 43 to be rotatable via a pin inserted into a hole portion along the rotation axis O1 of the rotating bracket 43.

The rotation connection portions 72 are integrally fixed to the one end of the bracket body 73. The bracket body 73 extends from the inside in a radial direction of a virtual circle having the axis O1 as a center toward the outside in the radial direction, with one end fixed to the rotation connection portions 72 as a base end.

Figure 8:
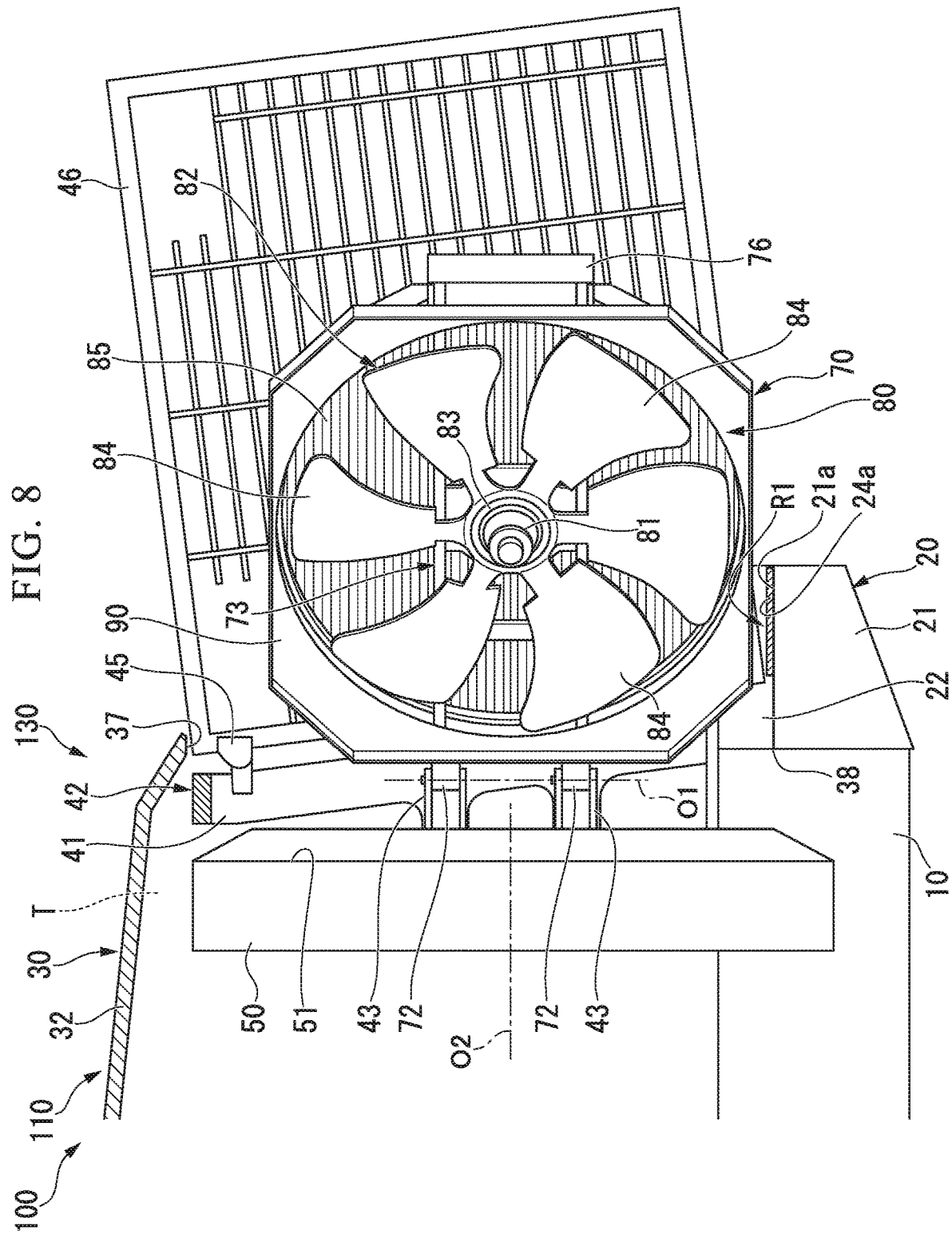
FIG. 8 is a side view of the cooling unit and the blower unit at an open position in a state where the vehicle rear portion of the wheel loader as the work vehicle according to the embodiment of the present invention is shown in a vertical section.
Figure 10:
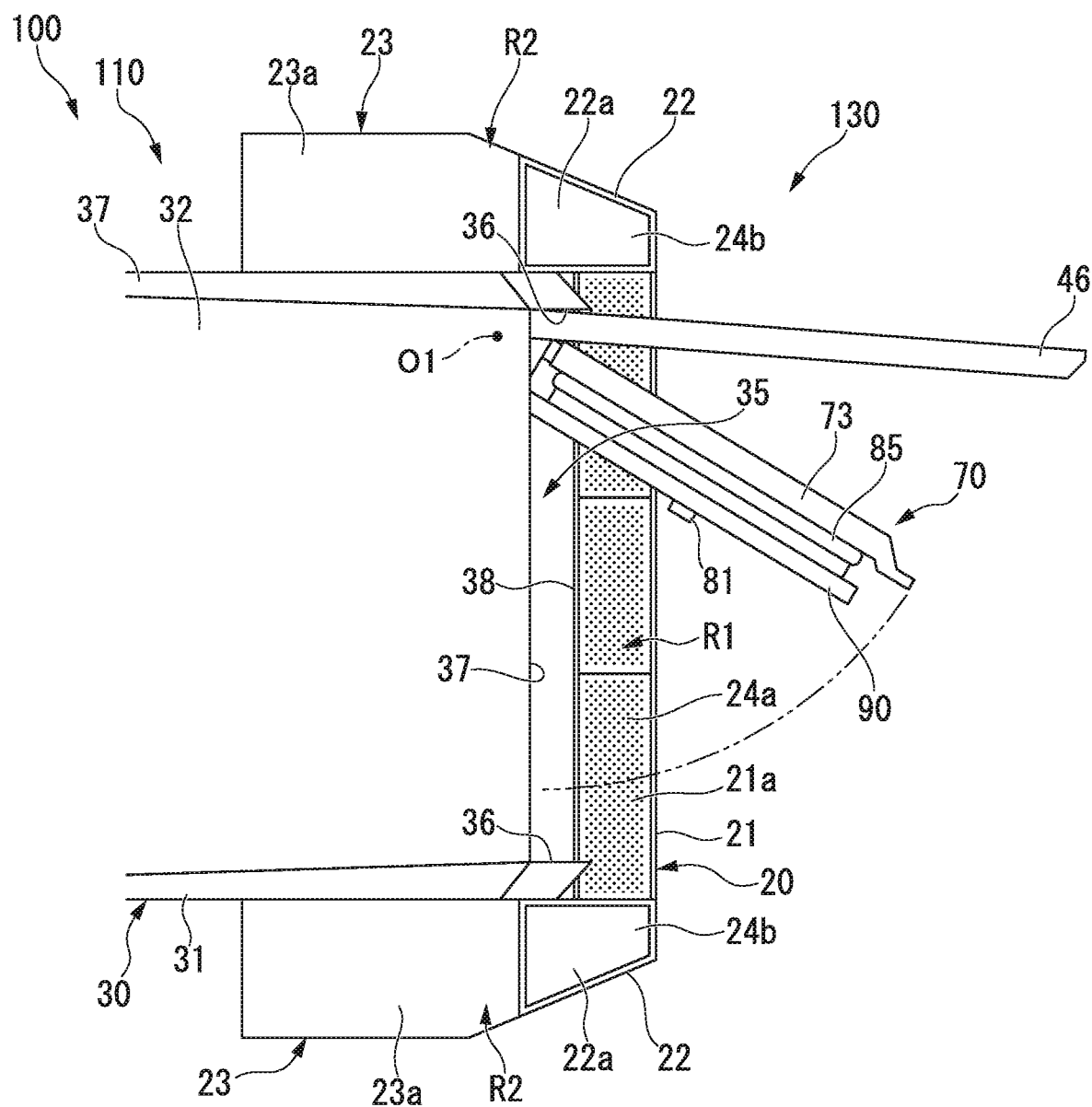
FIG. 10 is a plan view of the vehicle rear portion of the wheel loader as the work vehicle according to the embodiment of the present invention and a view showing the open position of the blower unit.

As shown in FIGS. 4 and 5, a state where the bracket body 73 extends in the width direction is the closed position of the blower unit 70. As shown in FIGS. 8 and 10, a state where the bracket body 73 rotates from the closed position toward the rear side of the vehicle rear portion 130 around the rotation axis O1 and the bracket body 73 diagonally extends to the rear side from the rotation axis O1 is the open position of the blower unit 70.

The fixing connection portion 76 is provided on the other end of the bracket body 73. As shown in FIG. 5, when the blower unit 70 is at the closed position, the fixing connection portion 76 detachably engages with the fixing bracket 44. Accordingly, the movable bracket 71 can switch between a fixed state where the fixing connection portion 76 engages with the fixing bracket 44 and a non-fixed state where the fixing connection portion 76 does not engage with the fixing bracket 44. For example, the fixing connection portion 76 can detachably engage with the fixing bracket 44 by well-known fixing means such as bolts or pins.

In addition, in the present embodiment, as shown in FIG. 5, when in the closed position, the bracket body 73 has a frame shape including a pair of vertical frame portions 74 which is disposed so as to be separated from each other on the right and left sides in the width direction and extends in the vertical direction, and a pair of horizontal frame portions 75 which connects the pair of the vertical frame portions 74 to each other in the width direction and is disposed so as to be separated from each other in the up-and-down direction. The rotation connection portions 72 are provided on one of the pair of vertical frame portions 74, and the fixing connection portion 76 is provided on the other.

<Fan>

As shown in FIGS. 4 and 8, the fan 80 includes a hydraulic motor 81 and a fan body 82.

The hydraulic motor 81 is rotationally driven by the hydraulic oil supplied via a hydraulic cable (not shown) from the hydraulic pump. The hydraulic motor 81 is fixed to a portion between the pair of horizontal frame portions 75 in the bracket body 73 of the movable bracket 71. The hydraulic motor 81 is fixed to a portion of the bracket body 73. The hydraulic motor 81 is disposed to protrude from the bracket body 73 toward the front side. The hydraulic motor 81 is configured such that a drive shaft rotates when the hydraulic oil is supplied to the hydraulic motor 81. In a case where the blower unit 70 is at the closed position, an axis of the drive shaft of the hydraulic motor 81 coincides with the reference axis O2.

The fan body 82 is rotationally driven by the hydraulic motor 81 to blow air. As shown in FIG. 8, the fan body 82 includes an attachment portion 83 attached to the drive shaft of the hydraulic motor 81, and a plurality of (six in the present embodiment) blades 84 fixed to the outer peripheral portion of the attachment portion 83 and provided at intervals therebetween in the peripheral direction of the drive shaft.

In a case where the blower unit 70 is positioned at the closed position, the fan 80 of the blower unit 70 faces the rear surface 51 of the cooling unit 50 from the rear side. If the hydraulic motor 81 is driven in this state, the fan body 82 rotates, and a flow of air from the front side toward the rear side is generated.

In addition, when the blower unit 70 is positioned at the closed position, the outer peripheral side of the rear surface 51 of the cooling unit 50, particularly, the corner portion thereof is deviated from the range facing the blower unit 70 while the fan body 82 faces the rear surface 51 of the cooling unit 50.

<Guard Portion>

As shown in FIGS. 4, 5 and 8, the guard portion 85 is a member which covers the fan 80 from the rear side and the outside of the fan 80 in the radial direction. Similarly to the grille 46 portion, the guard portion 85 has a lattice shape including a plurality of bar-shaped members and is integrally fixed to the movable bracket 71. The guard portion 85 ensures safety when the fan 80 rotates while the obstruction in the flow of air is prevented.

<Movable Shroud>

As shown in FIGS. 4 to 6, the movable shroud 90 is integrally provided on the blower unit 70 along with the fan 80. The movable shroud 90 has a tubular shape which covers at least a portion of the fan body 82 of the fan 80 from the outer peripheral side and has a function of introducing air to the fan body 82.

As shown in FIG. 6, the movable shroud 90 includes a connection tubular portion 91, a movable-side step portion 92, and a tubular portion 93.

The connection tubular portion 91 is a front portion of the movable shroud 90, and the front end of the connection tubular portion 91 comes into contact with the entire region in the peripheral direction of the fixed-side step portion 62 of the fixation shroud 60 via a seal member 94 when the blower unit 70 is positioned at the closed position. The connection tubular portion 91 has a tubular shape which extends to have a uniform flow path cross-sectional area from the front end toward the rear side.

The movable-side step portion 92 has a flat-plate shape which extends in the direction orthogonal to the reference axis O2, and the end portion on the outside in the radial direction of the movable-side step portion 92 is connected to the rear end of the connection tubular portion 91. The movable-side step portion 92 extends from the connection location with the connection tubular portion 91 toward the inside in the radial direction such that the opening area on the rear side of the connection tubular portion 91 decreases. In the present embodiment, the movable-side step portion 92 is fixed to the movable bracket 71. Accordingly, the movable shroud 90 is integrally fixed to the movable bracket 71.

The tubular portion 93 has a cylindrical shape in which the entire region in the peripheral direction faces the fan body 82 from the outside in the radial direction. A front end of the tubular portion 93 is connected to the end portion of the movable-side step portion 92 on the inside in the radial direction with respect to the reference axis O2. In addition, the above-described guard portion 85 is disposed on the rear side of the tubular portion 93 and the outer portion thereof in the radial direction, and a portion of the fan body 82 which protrudes toward the rear side of the tubular portion 93 is covered by the guard portion 85.

Figure 9:
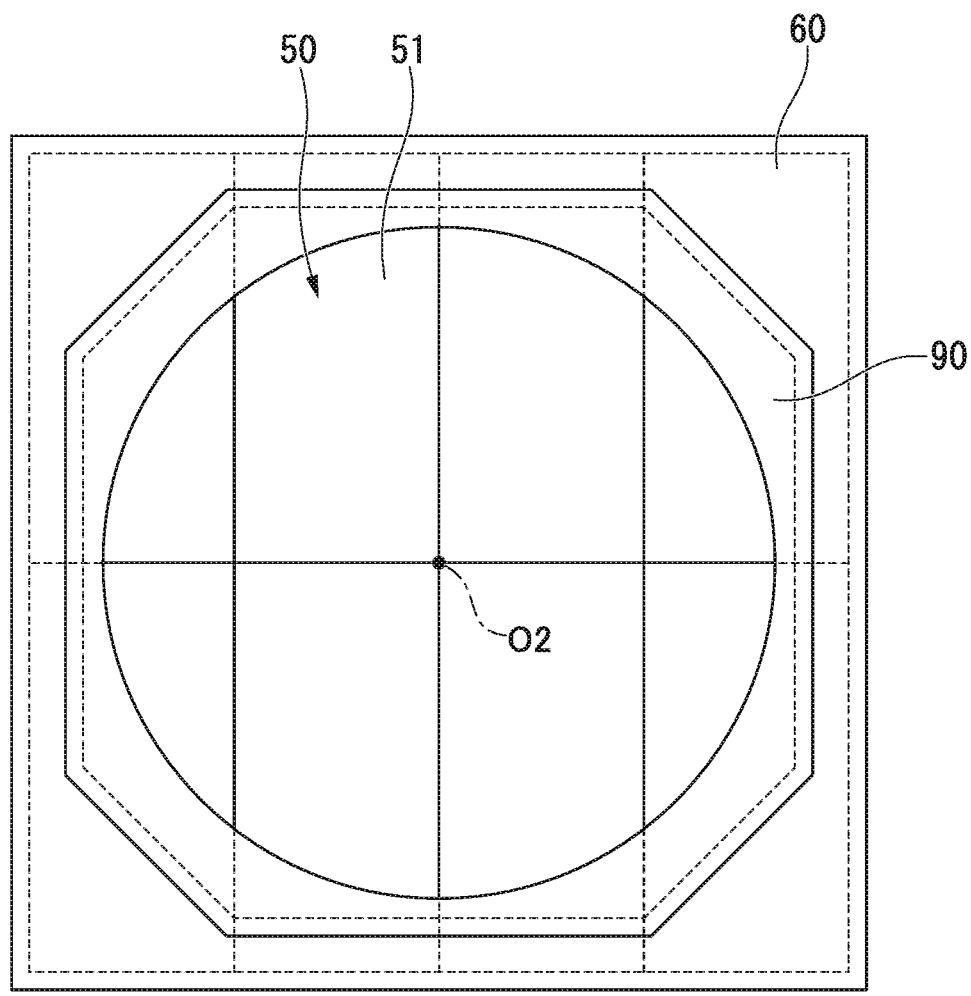
FIG. 9 is a schematic view when the fixation shroud and the movable shroud connected to the fixation shroud from the rear side are viewed from further rearward.

FIG. 9 is a schematic view when the fixation shroud 60 and the movable shroud 90 connected to the fixation shroud 60 from the rear side are viewed from further rearward, broken lines indicate the fixation shroud 60 and solid lines indicate the movable shroud 90.

Here, the shape of the front end of the connection tubular portion 91 of the movable shroud 90 has a shape according to the opening shape on the rear end of the fixation shroud 60. As shown in FIG. 9, in the present embodiment, since the opening shape of the rear end of the fixation shroud 60 is octagonal, the shape of the front end of the connection tubular portion 91 of the movable shroud 90 is octagonal.

The opening shape of the front end of the movable shroud 90 is one size larger than the opening shape of the rear end of the fixation shroud 60. As shown in FIG. 6, in a state where the front end of the movable shroud 90 abuts on the fixation shroud 60, a portion of the second taper portion 63, which is the portion on the rear end side of the fixation shroud 60, is inserted into the inside the connection tubular portion 91 of the movable shroud 90. In addition, the rear end of the fixation shroud 60 does not reach the front end of the tubular portion 93 of the movable shroud 90 on the inside in the radial direction of the reference axis O2, and is positioned at the same radial position as the tubular portion 93 or outside the tubular portion 93 in the radial direction.

As shown in FIG. 9, the opening area of the rear end of the movable shroud 90 is smaller than the opening area of the rear end of the fixation shroud 60. That is, the opening area of the fixation shroud 60 when viewed from the rear side is larger than the opening area of the movable shroud 90 when viewed from the rear side. In the present embodiment, the opening shape of the rear end of the fixation shroud 60 is octagonal, and the opening shape of the rear end of the movable shroud 90 is a circle which is one size smaller than the octagon of the fixation shroud 60.

The seal member 94 is provided over the peripheral entire region of the periphery having the reference axis O2 as a center on the front end of the movable shroud 90. For example, the seal member 94 is formed by an elastic body such as rubber. When the movable shroud 90 is positioned at the closed position, the seal member 94 of the movable shroud 90 side abuts on the fixation shroud 60 in the peripheral direction. Accordingly, the movable shroud 90 and the fixation shroud 60 come into close contact with each other without a gap. If the movable shroud 90 is transferred from the closed position to the open position, the seal member 94 and the movable shroud 90 are separated from the fixation shroud 60.

When the blower unit 70 is at the closed position, the blower unit 70 faces the rear surface 51 of the cooling unit 50 from the rear side. At this case, since the movable shroud 90 is connected to the rear side of the fixation shroud 60, a flow path which continues from the rear surface 51 of the cooling unit 50 toward the rear side is formed inside the fixation shroud 60 and the movable shroud 90. The diameter of the flow path decreases inside the fixation shroud 60 with the rear surface 51 of the cooling unit 50 as a starting point, and reaches the opening portion 35 of the vehicle rear portion 130 via the fan 80 inside the movable shroud 90. In this way, in the present embodiment, the shroud through which air is introduced to the fan 80 is configured of a segmented structure including the fixation shroud 60 and the movable shroud 90.

When the blower unit 70 rotates from the closed position to the open position, the blower unit 70 does not interfere with the side edge portions 36, the upper edge portion 37, and the lower edge portion 38 of the opening portion 35 of the vehicle rear portion 130. That is, each size of the fan 80, the movable shroud 90, and the guard portion 85 configuring the blower unit 70 is set to be capable of passing through the opening portion 35.

A movement region (a movement range of the blower unit 70) of the blower unit 70 including a rotation locus between the closed position and the open position of the blower unit 70 does not interfere with the vehicle rear portion 130 in which the grille 46 is open or other configurations. In the present embodiment, when the rotation around the rotation axis O2 is performed, the lower end of the blower unit 70 passes through a portion above the upper surface 21a in the bumper center portion 21 configuring the rear passage R1. That is, the movement region of the blower unit 70 passes through the portion above the upper surface 21a along the upper surface 21a without interfering with the upper surface 21a of the bumper center portion 21 configuring the rear passage R1. Accordingly, as shown in FIG. 10, the movement region of the blower unit 70 in a plan view when viewed from above overlaps the rear passage R1.

<Operation and Effect>

When the wheel loader 100 is operated, as shown in FIG. 4, the blower unit 70 is at the closed position, and the opening portion 35 of the vehicle rear portion 130 is closed by the grille 46. If the fan body 82 is rotated by driving the hydraulic motor 81 of the blower unit 70, ventilation is performed from the inside of the heat exchange room T formed by the exterior cover 30 toward the rear side via the opening portion 35. Accordingly, air which flows into the engine room F or the heat exchange room T via the ventilation portion 33 of the exterior cover 30 flows toward the rear side so as to pass through the cooling unit 50 inside the heat exchange room T. The air in which the temperature increases by cooling the cooling unit 50 flows through the flow path, which is formed by the fixation shroud 60 and the movable shroud 90, toward the rear side via the fan 80. Thereafter, the air is discharged from the opening portion 35 of the vehicle rear portion 130 via the grille 46.

Since the wheel loader 100 loads earth and sand, crushed stones, or the like to transport these, if the wheel loader 100 is used in the work, the wheel loader 100 is exposed to an environment where there are clouds of dust. Accordingly, the dust is attached to the blower unit 70 or the cooling unit 50. If earth and sand is attached to the drive shafts of the fan 80 of the blower unit 70 or the hydraulic motor 81, blowing efficiency decreases. If earth and sand is attached to the cooling unit 50, heat exchange efficiency decreases. Particularly, if earth and sand is attached to a gap between the radiation tubes of the radiator and clogging occurs, it is not possible to appropriately cool the cooling water of the engine 47. In addition, clogging easily occurs in the corner portions of the rear surface 51 of the cooling unit 50 deviated from the facing range of the fan 80. Therefore, cleaning is performed as part of a maintenance work with respect to the blower unit 70 and the cooling unit 50.

When the maintenance work is performed, a worker climbs the side passage R2 or the rear passage R1 of the vehicle rear portion 130, as shown in FIGS. 8 and 10, the grille 46 rotates from the closed state to the open state. Accordingly, in the wheel loader 100, the worker operates the blower unit 70 on the rear passage R1. Moreover, the worker operates the blower unit 70 on the rear passage R1 to rotate the blower unit 70 positioned at the closed position toward the rear side around the rotation axis O1. Accordingly, the blower unit 70 is positioned at the open position.

As shown in FIG. 10, the movement region of the blower unit 70 including the rotation locus when the blower unit 70 rotates has a fan shape with the rotation axis O1 as a center. As described above, the movement region of the blower unit 70 overlaps the rear passage R1 in a plan view when viewed from above.

In addition, the worker on the rear passage R1 performs the maintenance work such as removal of earth and sand with respect to the blower unit 70 positioned at the open position. Moreover, the worker on the rear passage R1 performs the maintenance work such as removal of earth and sand with respect to the fixation shroud 60 exposed to the rear side or the rear surface 51 of the cooling unit 50 exposed via the opening of the rear end of the fixation shroud 60 by positioning the blower unit 70 at the open position.

When the worker ends the maintenance work with respect to the blower unit 70, the fixation shroud 60, and the rear surface 51 of the cooling unit 50, the worker on the rear passage R1 returns the blower unit 70 from the open position to the closed position, and the worker on the rear passage R1 or the side passage R2 closes the grille 46. Accordingly, the wheel loader 100 becomes an operation state again.

As described above, the wheel loader 100 of the present embodiment is configured such that the movement region of the blower unit 70 overlaps the rear passage R1 in a plan view when viewed from above. Accordingly, the worker can perform work with respect to the blower unit 70 or the rear surface 51 of the cooling unit 50 on the rear passage R1 by positioning the blower unit 70 at the open position.

That is, particularly, in a case where the size of the wheel loader 100 is large, the blower unit 70 or the cooling unit 50 is disposed at a high location where hands of a worker are difficult to reach or do not reach. Accordingly, in order to perform the maintenance work on the blower unit 70, it is necessary to separately install a platform, a ladder or the like for the worker to climb, which causes the work to be complicated. In addition, the platform or the ladder is required to be moved to the installation location according to the locations of the blower unit 70 and the cooling unit 50, and the worker should ascend and descend the platform or the ladder when the movement is performed.

In the present embodiment, it is possible to perform the maintenance work on the blower unit 70 and the cooling unit 50 on the rear passage R1 of the vehicle rear portion 130 having high safety. Accordingly, it is possible to improve a work environment of the worker. Moreover, the worker can perform the maintenance work on the rear surface 51 of the cooling unit 50 positioned on the front side of the rear passage R1 in addition to the blower unit 70 from the rear passage R1. Accordingly, it is possible to easily switch from the maintenance work with respect to the blower unit 70 to the maintenance work with respect to the rear surface 51 of the cooling unit 50. That is, it is possible to avoid a burden on the movement of the platform or the ladder or ascending or descending of the worker described above, and it is possible to improve workability.

Moreover, in the present embodiment, the rotation axis O1 of the blower unit 70 extends in the vertical direction on one side of the vehicle body 110 in the width direction. Therefore, the worker can easily rotate the blower unit 70 and can easily perform the work with respect to the blower unit 70.

If the rotation axis O1 extends in the width direction on the upper portion of the opening portion 35, the worker needs to rotate the blower unit 70 up and down while supporting the weight of the blower unit 70. In addition, when the worker performs the work on the blower unit 70 positioned on the open position, the worker need to perform the work while viewing the blower unit 70 from above. In a case where the rotation axis O1 extends in the width direction on the lower portion of the opening portion 35, the worker avoids an inadvertent rotation due to the weight of the blower unit 70, the worker needs to rotate the blower unit 70 down while supporting the weight of the blower unit 70. In addition, the worker needs to perform the work while watching the footing with respect to the blower unit 70 at the open position. Therefore, in any case, the operation of rotating the blower unit 70 or the work with respect to the blower unit 70 is complicated.

In the present embodiment, since the rotation axis O1 extends in the vertical direction on the one side in the width direction, it is possible to easily rotate the blower unit 70 without a concern for the weight of the blower unit 70. In addition, since it is possible to perform the work at a height of a worker's eyes on the blower unit 70 at the open position, it is possible to avoid a complicated work.

Moreover, in the present embodiment, since the shroud through which air is introduced to the fan 80 is configured of a segmented structure including the fixation shroud 60 and the movable shroud 90, it is possible to easily perform the work on the movable shroud 90, the fixation shroud 60, and the fan 80. That is, since the shroud is the segmented structure, it is possible to increase the range where the worker's hands easily reach. In addition, in the shroud, since only the movable shroud 90 moves, compared to a case where an integrated shroud moves, a burden on the worker decreases. Accordingly, it is possible to improve workability.

Particularly, in the present embodiment, since the fixation shroud 60 and the movable shroud 90 are disposed in the front and rear, the worker can perform the work on the fixation shroud 60 and the movable shroud 90 on the rear passage R1. Accordingly, compared to a case where the movable shroud 90 and the fixation shroud 60 are integrally configured with each other, it is possible to improve workability. In addition, it is possible to easily perform the work on the rear surface 51 of the cooling unit 50 without problems via the opening of the fixation shroud 60. Particularly, it is possible to easily perform the work on corner portions of the rear surface 51 of the cooling unit 50 where clogging easily occurs.

Here, in a general shroud, in order to introduce air to the fan, a flow path cross-sectional area of the general shroud decreases from an upstream side toward a downstream side. Particularly, a gap between a portion of the shroud facing the outer peripheral side of the fan and the fan is set to be small in order to increase blowing efficiency of the fan. Accordingly, the opening area of the rear end of the shroud is relatively small. Therefore, in a case where the shroud does not have the segmented structure, even when the fan is removed from the inside of the shroud, an access to the cooling unit should be performed via a narrow opening of the rear end of the shroud, which causes the work to be complicated.

In the present embodiment, by positioning the movable shroud 90, in which the rear end has a relatively small opening area, at the open position, it is possible to perform the work with respect to the rear surface 51 of the cooling unit 50 via the opening of the fixation shroud 60 in which the rear end has a relatively large opening area. Accordingly, it is possible to improve workability with respect to the cooling unit 50 or visibility with respect to the rear surface 51 of the cooling unit 50. Particularly, it is possible to improve accessibility of the work with respect to the corner portions of the rear surface 51 of the cooling unit 50.

Moreover, in the present embodiment, since the seal member 94 is provided in the contact location between the fixation shroud 60 and the movable shroud 90, it is possible to prevent air from leaking from the contact location between the fixation shroud 60 and the movable shroud 90 to the outside. Therefore, even when the shroud is the segmented structure including the fixation shroud 60 and the movable shroud 90, it is possible to secure the function of the shroud through which air is introduced to the fan 80.

Here, in the wheel loader 100 having a large size, since an amount of heat of the engine 47 or other locations is large, the cooling unit 50 is likely to have a large size. In the case where the cooling unit 50 has a large size, the size of the heat exchange room T in the vertical direction increases in order to accommodate the cooling unit 50. The exterior cover 30 is positioned above and visibility from the cab 160 toward the rear side deteriorates as the size of the heat exchange room T increase upwardly. Accordingly, in order to dispose the lower end of the cooling unit 50 further downward, in the present embodiment, it is possible to prevent the size of the exterior cover 30 from inadvertently increasing by disposing the lower end of the cooling unit 50 and the lower end of the fixation shroud 60 further downward.

That is, in the present embodiment, according to an increase in the size of the cooling unit 50, the lower ends of the cooling unit 50 and the fixation shroud 60 are disposed below the lower edge portion of the opening portion 35 positioned in the rear portion of the vehicle body 110, that is, are disposed below the rear passage R1. Accordingly, the fixation shroud 60 cannot pass through the opening portion 35. Therefore, in the fixation shroud 60 and the movable shroud 90, only the movable shroud 90 can move from the closed position to the open position via the opening portion 35. That is, in the fixation shroud 60 and the movable shroud 90, only the movable shroud 90 having a size capable of passing through the opening portion 35 can move. Accordingly, it is possible to secure workability with respect to the movable shroud 90, the fixation shroud 60, and the rear surface 51 of the cooling unit 50.

In addition, in the present embodiment, since the upper end of the cooling unit 50 or the fixation shroud 60 is positioned above the rear lights 45 or the lower end of the upper frame 42 of the support frame 40, the cooling unit 50 or the fixation shroud 60 interferes with the rear lights 45 or the support frame 40. Since the blower unit 70 does not interfere with the structures such as the rear lights 45 or the support frame 40, it is possible to transfer the blower unit 70 from the closed position to the open position via the opening portion 35 of the vehicle rear portion 130. Accordingly, as described above, it is possible to secure workability with respect to the movable shroud 90, the fixation shroud 60, and the rear surface 51 of the cooling unit 50.

<Other Embodiments>

Hereinbefore, the embodiment of the present invention is described. However, the present invention is not limited to this and can be appropriately modified within a scope which does not depart from the technical scope of the present invention.

For example, in the present embodiment, the blower unit 70 is rotatably supported by the rotating bracket 43 of the support frame 40. However, the present invention is not limited to this, and the rotation support portion which rotatably supports the blower unit 70 may be provided in other configurations of the vehicle rear portion 130.

Similarly to the blower unit 70, the grille 46 may be supported by not only the support frame 40 but also other configurations of the vehicle rear portion 130.

The rotation axis O1 may extend not only in the vertical direction on one side of the vehicle in the width direction but also in the vertical direction on the other side of the vehicle in the width direction. In addition, the rotation axis O1 may extends in the width direction along the upper edge portion or the lower edge portion of the opening portion 35 of the vehicle rear portion 130. In this case, a worker can perform the work on the blower unit 70 on the rear passage R1 as long as the movement region of the blower unit 70 overlaps the rear passage R1 in a plan view when viewed from above.

The rotation axis O1 may be inclined in the width direction or the forward-backward direction. In this case, since the movement region of the blower unit 70 does not interfere with the vehicle rear portion 130 or other structures, the blower unit 70 can rotate between the closed position and the open position.

It is described that the reference axis O2 is the axis passing through the center of the rear surface 51 of the cooling unit 50. However, the present invention is not limited to this, the reference axis O2 may be disposed to be deviated in the width direction or the vertical direction from the center of the rear surface 51. In this case, the centers of the fixation shroud 60, the movable shroud 90, and the fan 80 are deviated according to the disposition of the reference axis O2.

In the embodiment, the configuration is described in which the blower unit 70 rotates around the rotation axis O1 and the blower unit 70 is operated between the closed position and the open position. However, the present invention is not limited to this, the movement of the blower unit 70 is not limited to the rotation, and may be other movements. For example, a guide, a rail, or the like which guides the blower unit 70 between the closed position and the open position may be provided so as to move the blower unit 70 forward and backward. In this case, the blower unit 70 may linearly move or may curvedly move. Moreover, the blower unit 70 may move so as to change the direction in the middle of the movement of the blower unit from the closed position to the open position.

In the embodiment, the rear lights 45 or the upper frame 42 of the support frame 40 is exemplified as the upper structure positioned above the blower unit positioned at the closed position in the heat exchange room T. However, the present invention is not limited to this, and other upper structures may be positioned. In this case, it is possible to rotate the blower unit 70 between the closed position and the open position as long as the upper structure does not interfere with the movement region of the blower unit 70.

In the embodiment, the seal member 94 is provided on the front end of the movable shroud 90. However, the seal member 94 may be provided in the fixation shroud 60 and may be provided in both of the fixation shroud 60 and the movable shroud 90. Moreover, in the embodiment, the seal member 94 is provided over the entire region in the peripheral direction of the periphery having the reference axis O2 as a center. However, the seal member 94 may be provided in only a portion in the peripheral direction.

A configuration may be adopted in which the seal member 94 is not provided, the front end of the movable shroud 90 directly abuts on the fixation shroud 60, and the movable shroud 90 and the fixation shroud 60 come into contact with each other.

In the embodiment, the example is explained in which the hydraulic motor 81 is adopted as the drive source of the fan 80. However, the drive source may be an electric motor, and for example, the fan 80 may be rotated with the engine 47 as a drive source. In addition, other drive mechanisms may be adopted as the drive source of the fan 80.

In the embodiment, the fixation shroud 60 and the movable shroud 90 are connected to each other in the forward-backward direction, that is, the shroud is segmented in the front and rear. However, the present invention is not limited to this. For example, the shroud may be segmented into the peripheral direction of the reference axis O2 or may be segmented in the vertical direction. In this case, this configuration is adopted as long as only a portion of the rear surface 51 of the cooling unit 50 which needs to improve workability or visibility can move as the movable shroud 90. In addition, only the portion of the shroud which does not interfere with the structures such as the opening portion 35, the rear lights 45, or the upper frame 42 of the vehicle rear portion 130 may be segmented as the movable shroud 90, and the remaining portions thereof may be fixed to the cooling unit 50 as the fixation shroud 60.

In the embodiment, the rear surface 51 of the cooling unit 50 has a rectangular shape. However, the rear surface 51 may have other polygonal shapes or other shapes such as a circular shape. The opening shape of the front end of the fixation shroud 60 may be other shapes different from the rectangular shape in accordance with the shape of the cooling unit 50. Moreover, the opening shape of the front end of the fixation shroud 60 may be a shape different from the shape of the rear surface 51 of the cooling unit 50.

In the embodiment, the opening shape of the rear end of the fixation shroud 60 is octagonal. However, the present invention is not limited to this, and the opening shape may be other polygonal shapes or other shapes such as a circular shape. The opening shape of the front end of the movable shroud 90 may be other shapes different from the octagonal shape in accordance with the opening shape of the opening shape of the rear end of the fixation shroud 60. Moreover, the opening shape of the front end of the movable shroud 90 may be a shape different from the opening shape of the rear end of the fixation shroud 60.

The opening shape of the rear end of the movable shroud 90 is not limited to the circular shape, and may be other shapes. In this case, preferably, the opening area of the rear end of the movable shroud 90 is larger than the opening area of the rear end of the fixation shroud 60. Accordingly, when the movable shroud 90 is positioned at the open position, it is possible to improve workability and visibility with respect to the cooling unit 50 via the fixation shroud 60.

The shape of the opening portion 35 of the vehicle rear portion 130 is not limited to the rectangular shape, and may be other shapes. In this case, preferably, a shape of the opening portion 35 which can pass through the opening portion 35 by rotating blower unit 70 is adopted.

In the embodiments, the wheel loader 100 is described as one example of the work vehicle of the present invention. However, for example, the present invention may be applied to other work vehicles such as a motor grader as the work vehicle. In addition, the present invention may be applied to other work vehicles including the cooling unit 50 and the blower unit 70.

INDUSTRIAL APPLICABILITY

According to the work vehicle having the above-described aspects, it is possible to easily perform the work for the cooling unit or the blower unit.

REFERENCE SIGNS LIST

10: rear frame, 20: bumper, 21: bumper center portion, 21a: upper surface, 22: bumper side portion, 22a: upper surface, 23: accommodation portion, 23a: upper surface, 24a: nonslip mat, 24b: nonslip mat, 30: exterior cover, 31: side cover, 32: top cover, 33: ventilation portion, 35: opening portion, 36: side edge portion, 37: upper edge portion, 38: lower edge portion, 40: support frame, 41: side frame, 42: upper frame (upper structure), 43: rotating bracket, 44: fixing bracket, 45: rear light (upper structure), 46: grille, 47: engine, 50: cooling unit, 51: rear surface, 60: fixation shroud, 61: first taper portion, 62: fixed-side step portion, 63: second taper portion, 70: blower unit, 71: movable bracket, 72: rotation connection portion, 73: bracket body, 74: vertical frame portion, 75: horizontal frame portion, 76: fixing connection portion, 80: fan, 81: hydraulic motor, 82: fan body, 83: attachment portion, 84: blade, 85: guard portion, 90: movable shroud, 91: connection tubular portion, 92: movable-side step portion, 93: tubular portion, 94: seal member, 100: wheel loader, 110: vehicle body, 120: vehicle front portion, 130: vehicle rear portion, 140: front wheel, 150: rear wheel, 160: cab, 170: fuel tank, 180: work equipment, 181: boom, 182: bucket, 183: boom drive cylinder, 184: bucket drive cylinder, R1: rear passage, R2: side passage, E: engine room, T: heat exchange room, O1: rotation axis, O2: reference axis

The invention claimed is:

1. A work vehicle, comprising:
a vehicle body that includes a heat exchange room in which an opening portion facing a rear side of the vehicle body is formed, and a rear passage extending in a width direction along a lower edge portion of the opening portion behind the opening portion and on an upper surface of the rear passage a nonslip mat being provided over the width direction;
a cooling unit that is provided in the heat exchange room and includes a rear surface facing the rear side;

a blower unit that includes a fan rotationally driven and a movable shroud covering the fan from an outer peripheral side, and that is supported to be movable with respect to the vehicle body so that a movement region of the blower unit in a plan view overlaps the rear passage between a closed position at which the blower unit faces the rear surface of the cooling unit and an open position at which the blower unit exposes the rear surface of the cooling unit; and a fixation shroud that has an annular shape, that is provided on the rear surface of the cooling unit in the heat exchange room, and that forms a flow path through which air is introduced from the rear surface of the cooling unit to the fan along with the movable shroud of the cooling unit positioned at the closed position, wherein the fixation shroud includes a fixed-side step portion, and a taper portion, wherein the fixed-side step portion has a flat-plate shape having a surface orthogonal to a forward-backward direction of the vehicle body, wherein the taper portion is connected to the fixed-side step portion and has a shape in which a flow path cross-sectional area decreases from an end portion on an inside in a radial direction of the fixed-side step portion toward the rear side, wherein the movable shroud has a connection tubular portion having a tubular shape which extends to have a uniform flow path cross-sectional area from a front end of the connection tubular portion toward the rear side, and the front end of the connection tubular portion comes into contact with the fixed-side step portion.

2. The work vehicle according to claim 1,
wherein the movable shroud has an annular shape which covers the fan from the outer peripheral side, and is connected to the fixation shroud from the rear side when the blower unit is positioned at the closed position.

3. The work vehicle according to claim 2,
wherein an opening area of the fixation shroud when viewed from the rear side is larger than an opening area of the movable shroud when viewed from the rear side.

4. The work vehicle according to claim 3, further comprising:
a seal member which causes the movable shroud and the fixation shroud to be in close contact with each other when the blower unit is positioned at the closed position.

5. The work vehicle according to claim 3,
wherein a lower end of the cooling unit and a lower end of the fixation shroud are positioned below the lower edge portion of the opening portion, and a lower end of the blower unit is positioned above the lower edge portion of the opening portion.

6. The work vehicle according to claim 3,
wherein the vehicle body includes an upper structure above the blower unit positioned at the closed position in the heat exchange room, and wherein upper ends of the cooling unit and the fixation shroud are positioned above a lower end of the upper structure.

7. The work vehicle according to claim 2, further comprising:
a seal member which causes the movable shroud and the fixation shroud to be in close contact with each other when the blower unit is positioned at the closed position.

8. The work vehicle according to claim 2,
wherein a lower end of the cooling unit and a lower end of the fixation shroud are positioned below the lower edge portion of the opening portion, and a lower end of the blower unit is positioned above the lower edge portion of the opening portion.

9. The work vehicle according to claim 2,
wherein the vehicle body includes an upper structure above the blower unit positioned at the closed position in the heat exchange room, and wherein upper ends of the cooling unit and the fixation shroud are positioned above a lower end of the upper structure.

10. The work vehicle according to claim 1, further comprising:
a seal member which causes the movable shroud and the fixation shroud to be in close contact with each other when the blower unit is positioned at the closed position.

11. The work vehicle according to claim 10,
wherein a lower end of the cooling unit and a lower end of the fixation shroud are positioned below the lower edge portion of the opening portion, and a lower end of the blower unit is positioned above the lower edge portion of the opening portion.

12. The work vehicle according to claim 10,
wherein the vehicle body includes an upper structure above the blower unit positioned at the closed position in the heat exchange room, and wherein upper ends of the cooling unit and the fixation shroud are positioned above a lower end of the upper structure.

13. The work vehicle according to claim 1,
wherein a lower end of the cooling unit and a lower end of the fixation shroud are positioned below the lower edge portion of the opening portion, and a lower end of the blower unit is positioned above the lower edge portion of the opening portion.

14. The work vehicle according to claim 13,
wherein the vehicle body includes an upper structure above the blower unit positioned at the closed position in the heat exchange room, and wherein upper ends of the cooling unit and the fixation shroud are positioned above a lower end of the upper structure.

15. The work vehicle according to claim 1,
wherein the blower unit is supported to rotatably move with respect to the vehicle body around a rotation axis which extends in a vertical direction on one side of the vehicle body in the width direction.

16. The work vehicle according to claim 1,
wherein the vehicle body includes an upper structure above the blower unit positioned at the closed position in the heat exchange room, and wherein upper ends of the cooling unit and the fixation shroud are positioned above a lower end of the upper structure.

17. The work vehicle according to claim 1,
wherein the vehicle body includes:
a pair of rear frames which extends in the forward-backward direction at intervals therebetween in the width direction;
an exterior cover that is provided above the pair of the rear frames and in which the heat exchange room is formed inside the exterior cover; and
a bumper that is provided to extend in the width direction over the pair of rear frames on a rear sides of the rear frames includes an upper surface which becomes the rear passage, and partitions and forms the opening portion along with the exterior cover.

* * * * *